United States Patent [19]
Bloom

[11] 3,721,713
[45] March 20, 1973

[54] PROCESS FOR OBTAINING 2,4,7-TRINITROFLUORENONE

[75] Inventor: Albert Bloom, Boston, Mass.

[73] Assignee: Industrial Dyestuff Company, East Providence, R.I.

[22] Filed: April 10, 1970

[21] Appl. No.: 27,446

[52] U.S. Cl. .................................................260/590
[51] Int. Cl. ............................................C07c 49/76
[58] Field of Search.....................................260/590

[56] References Cited

OTHER PUBLICATIONS

Woolfolk et al., Organic Syntheses 28, 91–93 (1948) copy in P.O. Chemical Library, call no. QD 262.07

Primary Examiner—Daniel D. Horwitz
Attorney—Leonard Horn and Burgess, Dinklage & Sprung

[57] ABSTRACT

2,4,7-trinitrofluorenone, prepared by nitrating fluorenone with a mixture of nitric and sulfuric acids, without refluxing, is obtained in high purity by addition of water to the reaction mass thereby precipitating it from solution while leaving dissolved isomers and other nitration products.

10 Claims, No Drawings

PROCESS FOR OBTAINING 2,4,7-TRINITROFLUORENONE

BACKGROUND OF THE INVENTION

A number of processes have been proposed and published for the preparation of 2,4,7-trinitrofluorenone, hereinafter at times referred to as TNF. Schmidt and Bauer, Ber. 38 3760 (1905) reported that the trinitration of fluorenone can be accomplished by reacting the fluorenone with a mixture of concentrated fuming nitric acid and concentrated sulfuric acid by refluxing for several hours. Schmidt et al., Ann. 390 231 also disclosed a process of producing TNF using essentially the same procedure as described in the report by Schmidt and Bauer. Ray and Francis, J. Org. Chem. 8 58 (1943) also reported the use of the procedure of Schmidt and Bauer to effect trinitration of fluorenone. More recently, Orchin et al. J.A.C.S. 60 1225 and J.A.C.S. 68 1727 reported on a laboratory process for the trinitration of fluorenone which was again later published in Organic Synthesis, 28, page 91. This later process is generally satisfactory for preparing small amounts of TNF. All of the processes reported as described above result in the production of a crude TNF compound which requires multi-step purification procedures to obtain a satisfactory product.

The best prior art procedure for producing TNF involves preparing a solution of fluorenone in glacial acetic acid and carefully adding this mixture to a large portion of red fuming nitric acid and concentrated sulfuric acid. This mixture of nitric and sulfuric acid, generally referred to as "Mixed Acid" is anhydrous and since red fuming nitric acid contains about 20 percent free $NO_2$, there is considerable evolution of nitrous oxides during the reaction. As such, it is a potent oxidizing agent, highly corrosive, and must be handled with extreme care. This reaction mixture is then heated to reflux and a mixture of nitrous and nitric oxides plus nitric acid is constantly distilled from and partly returned to the reaction mixture. At the end of the reaction, the mixture is diluted with ice which precipitates the crude TNF compound. The crude compound is then collected and purified, after extensive treatment with steam, by several recrystallizations from acetic acid.

In the above reported process, the mole ratio of nitric acid to fluorenone is about 100 to 1. Since the theoretical ratio is 3 to 1, the process requires approximately 30 times the theoretical requirement. Attempts to reduce the amount of nitric acid significantly below 30 times theory failed to give TNF of high purity.

Performing the best prior art process for TNF as described above is somewhat hazardous and requires unusual equipment as set forth below:

1. The addition of anhydrous acetic acid to an anhydrous Mixed Acid, a mixture which has been known to explode (possibly through the formation of peracetic acid), is a prime operational hazard;

2. the equipment needed to perform the operation must be resistant to nitric acid in the form of Mixed Acid, and in the form of liquid and vapor.

SUMMARY OF THE INVENTION

This invention involves the nitration of fluorenone by slowly adding the fluorenone to a mixture of nitric acid and sulfuric acid in which the mole ratio of nitric acid to fluorenone is significantly lower than required by prior art processes. After the complete addition of the fluorenone the reaction is permitted to proceed without refluxing, then water is added in controlled amount, selectively to precipitate the 2,4,7-trinitrofluorenone while leaving in solution other nitration products. The precipitate may be washed with cold acid of approximately the same composition as in the solution to remove any adherent by-products.

This invention provides an advantageous process for producing 2,4,7-trinitrofluorenone of high purity in a simple and safe manner with high yields. The process is carried out using a much lower nitric acid-fluorenone mole ratio of lower temperature, eliminates the necessity of refluxing nitric acid, eliminates the hazard of a mixture of acetic and concentrated nitric acids, and eliminates the purification step heretofore required.

DESCRIPTION OF PREFERRED EMBODIMENTS

The mole ratio of nitric acid to fluorenone is preferably at least about 15 to 1 and advantageously approximately 30 to 1. Higher mole ratios of nitric acid to fluorenone could be used, such as 40 to 1 and above, but this is not advantageous from an economical standpoint. At lower ratios the yield of the desired product is significantly reduced.

The ratio of nitric acid to sulfuric acid that can be used can also be varied so long as there is sufficient nitric acid and sulfuric acid present to effect the trinitration of the fluorenone as contemplated by this invention. In theory the sulfuric acid serves as a diluent or solvent for the nitric acid as well as a promotor for the nitration itself. Consequently the sulfuric acid content can be very high, but it is desirably kept as low as practical relative to the nitric acid while still avoiding giving off fumes of nitrogen oxides. Thus, the nitric acid concentration in the Mixed Acid may range from about 0.5 to 2 times the sulfuric acid concentration; advantageously the ratio is about 0.75 to 1.25 and preferably it is about 1.

The optimum concentrations of nitric and sulfuric acid which will permit smooth reaction with fluorenone below reflux temperature may vary somewhat. A simple test of a suitable mix is to add 1 gram of the fluorenone slowly to 100 cc of the Mixed Acid at room temperature with stirring and, if the fluorenone does not dissolve in 5 minutes, the particular composition is not optimal for trinitration Preferably the Mixed Acid with which the fluorenone is reacted contains a small amount of water to control the reaction, especially as the nitric acid concentration goes up. If no water is present in the Mixed Acid and the fluorenone is directly added thereto in the absence of special measures the highly exothermic reaction may cause decomposition of the fluorenone and the production of by-products, such as the tetranitrofluorenone, which will complicate, if not preclude, recovery of the 2,4,7-trinitrofluorenone of high purity. The amount of water desirably in the Mixed Acid before addition of the fluorenone will therefore depend, in part, upon the ratio of nitric acid to sulfuric acid in the Mixed Acid; if too much water, e.g., more than 20 percent, is present in the mixed acid the reaction will not proceed, i.e., while nitration may occur there will be little if any trinitrofluorenone produced. Generally, there should be at least about 5 percent of water in the mixed acid as a moderator. A mixed acid containing approximately 45 percent nitric acid, 45 percent sulfuric acid and 10 percent water is preferred. The ratio of nitric to sulfuric acid and the amount of such mixed acid used may be varied, as will be appreciated by those skilled in the art, provided there is sufficient to effect the trinitration at a temperature below about 60°C and allow the separation of pure 2,4,7-trinitrofluorenone by the judicious addition of water to the reaction mixture as contemplated by this invention.

In practicing the invention, the solid fluorenone is slowly added to the Mixed acid, optionally containing the water. The rate of addition will depend somewhat upon the acid concentration of the Mixed Acid. Using equal proportions of concentrated nitric acid and sulfuric acid with 10 percent water, the addition of the fluorenone thereto can take place over a period of time about 1 to 4 hours. During the addition of the fluorenone the temperature of the reaction mixture is maintained below the reflux temperature thereof and can be controlled by the rate of addition of the fluorenone and/or by cooling the reaction mixture. The reflux temperature of the reaction mixture is above 55°C. The reaction mixture is preferably stirred during the reaction while maintaining the temperature below the reflux temperature thereof until the reaction is complete. Using approximately equal parts nitric and sulfuric acid and 10 percent by weight water, the reaction is generally completed between about 10 and 18 hours.

After the reaction has been completed, the reaction mixture may be cooled and sufficient water added thereto to precipitate the 2,4,7-trinitrofluorenone and to retain nitrofluorenone isomers or other by-products in solution. The amount of water added will depend upon the composition of the Mixed Acid and the mole ratio. The optimum amount of water added to the reaction mixture to crystallize the 2,4,7-trinitrofluorenone in substantially pure form can of course be determined by routine experimentation by those skilled in the art.

Prior to the addition of water to precipitate the pure 2,4,7-trinitrofluorenone the reaction mixture may be cooled to prevent a temperature rise of the reaction mixture to beyond about 60°C. since the addition of the water to the reaction mixture results in a mild exothermic reaction. Maintaining the temperature below 60°C. during the addition of the water again prevents volatilization of the nitric acid remaining in the reaction mixture. If the reaction mixture is cooled to between about 20° to 30°C. the addition of the water will generally not raise the temperature of the reaction mixture above about 50° to 60°C. depending upon the particular proportions being used in the reaction.

After the water has been added to the reaction mixture it is preferably stirred and then further cooled to about 10° to 15°C. The reaction mixture, for example, could be cooled to about 0°C. if desired. This further cooling step minimizes losses of 2,4,7-trinitrofluorenone.

The reaction mixture is then filtered and the precipitate washed with sulfuric acid of a strength having a low solubility for the end-product 2,4,7-trinitrofluorenone and a high solubility for other by-products and isomers, particularly the di- and tetranitrofluorenones. It has been found that an 80 percent aqueous solution of sulfuric acid is preferable since relatively little 2,4,7-trinitrofluorenone is dissolved with aqueous sulfuric acid containing between about 70 to 90 percent sulfuric acid. High acid concentrations used in this washing step tend to dissolve the 2,4,7-trinitrofluorenone product, while the use of sulfuric acid of less than about 70 percent does not dissolve all the other by-products, resulting in a less pure product. The acid washing of the 2,4,7-trinitrofluorenone product is also advantageously carried out at a temperature below about 20°C. again to minimize the solubility of the 2,4,7-trinitrofluorenone in the acid wash and to maximize the solubility of the impurities, particularly the nitrofluorenone isomers.

The washed filter cake is then preferably slurried in water, filtered and the 2,4,7-trinitrofluorenone product washed free of acid with water.

It is a further feature of the present invention that the selective precipitation of 2,4,7trinitrofluorenone from admixture with isomers and other fluorenone nitration products can be effected with solvents other than the nitration mix and with reaction products other than those resulting from the nitration described hereinabove. For example, the prior art nitration procedures may be employed to produce an admixture of 2,4,7-trinitrofluorenone with isomers and other fluorenone nitration products and, by quenching with water, all the nitration products can be precipitated. The solids, after drying, may then be dissolved in a suitable acid, as hereinafter described, and water added incrementally to precipitate the 2,4,7-trinitrofluorenone selectively. It is a special feature of the present invention that the special solids mixtures herein involved together with the special solvents herein involved give solutions which will precipitate the desired material in large amount without precipitating any significant amounts of the undesired materials. Thus, the major proportion of the total 2,4,7-trinitrofluorenone in the solution can be brought down by addition of water and the 2,4,7-trinitrofluorenone percipitate will be associated with very little of the undesired fluorenone nitration products, frequently as little as 1 percent or less of its own weight. This is due to the highly selective insolubility. The amount of water usually employed in carrying out the precipitation can be substantially increased without substantially increasing the yield of 2,4,7-trinitrofluorenone and, more important, without substantially increasing the amount of undesired nitration products coprecipitated therewith, i.e., the precipitation is both selective and fortunately not sensitive to minor changes in water concentration.

The solvent from which selective precipitation is effected is preferably the nitration medium but, if desired, the nitration medium after completion of the reaction can be quenched in water and the total solids re-dissolved for selective precipitation of the 2,4,7-trinitrofluorenone in accordance with this aspect of the invention. The solvent can of course be of the same composition as the nitration medium or it could be sulfuric acid, nitric acid or mixtures thereof in sufficient amount to dissolve all the solids. Water may also be present but it will make it that much more difficult to effect initial dissolution. Consequently, if the solvent is not the nitration medium there is little point in having as much as 20 percent of water in the solvent and desirably it should be about 15 percent at most. Desirably, however, about 5 to 10 percent of water is present since the addition of water to an anhydrous acid solution is extremely exothermic whereas the same amount of water added to the somewhat diluted solution gives off much less heat and avoids the possibility of uncontrolled ebullition and spilling over.

The precipitate can then be worked up in the same manner as when the selective precipitation of the 2,4,7-trinitrofluorenone is carried out on the nitration mass per se.

The 2,4,7-trinitrofluorenone is a known product having known uses. The 2,4,7-trinitrofluorenone is particularly useful in xerography in the production of photoconductive insulating materials adapted for use in electrophotographic plates as disclosed, for example, in U.S. Pat. No. 3,408,183 and in French Pats. Nos. 1,477,139 and 1,463,743.

The invention will be further illustrated by the following example wherein, as elsewhere hereinabove, all parts are by weight unless specified.

EXAMPLE

Into a vessel there are charged 7963 cc (13,144 grams) of mixed acid comprising by weight 45% $HNO_3$, 45% $H_2SO_4$ and 10% water. 562.5 grams of fluorenone are added over 1.5 hours, employing cooling when necessary to prevent the temperature from rising above 55°C. The mass is then cooled to 25°C. and 875 cc of water are added, a precipitate thereby forming. The mass is cooled to 10°–15°C. with stirring and filtered and the filter cake is washed with 2,000 cc of 85 percent sulfuric acid at 15°C.; the wash liquor is deep yellow in color. The cake is stirred into hot water at 90°C.; filtered hot, and washed with water at 65°C.; the final wash water pH is about 7.0, indicating removal of all free acid. There are obtained 635 grams of 2,4,7-trinitrofluorenone of high purity, melting at 183°–185 °C.

In the foregoing example the 875 cc of water added to effect precipitation can almost be doubled without coprecipitating other by-products.

It will be appreciated that the instant specification and examples are set forth by way of illustration and not limitation, and that various modifications and changes may be made without departing from the spirit and scope of the present invention.

What is claimed is:

1. The process for the recovery of 2,4,7-trinitrofluorenone from a mixture with isomers and other nitration products of fluorenone which comprises forming a solution of the mixture in sulfuric acid, nitric acid or mixed sulfuric and nitric acids containing about 5 to 20 percent of water, and adding water, thereby selectively precipitating the 2,4,7-trinitrofluorenone.

2. The process of claim 1 wherein the precipitate is washed with aqueous sulfuric acid, nitric acid or mixed sulfuric and nitric acids in approximately the same proportions as in the solution to remove adhering isomers and other fluorenone nitration products.

3. The process of claim 1 wherein the initial solution of the mixture is produced by contacting fluorenone with a Mixed Acid comprising nitric acid and sulfuric acid, there being about 15 to 40 moles of nitric acid per mole of fluorenone.

4. The process of claim 3 wherein the concentration of nitric acid in the Mixed Acid ranges from about 0.5 to about 2 times that of the sulfuric acid.

5. The process of claim 3 wherein the solution obtained by contact of fluorenone with mixed acid is maintained below reflux temperature.

6. The process for the preparation of 2,4,7-trinitrofluorenone in high yield and readily recoverable form which comprises contacting fluorenone with Mixed Acid consisting essentially of a mixture of nitric acid, sulfuric acid and about 5 to 20 percent of water, there being about 15 to 40 moles of nitric acid per mole of fluorenone, the composition of the Mixed Acid being such that 1 gram of fluorenone will dissolve in 5 minutes in 100cc of the Mixed Acid with stirring at room temperatures, and maintaining the mixture of fluorenone and Mixed Acid at a temperature below reflux.

7. The process of claim 6 wherein the concentration of nitric acid in the Mixed Acid ranges from about 0.5 to about 2 times that of the sulfuric acid.

8. The process of claim 6 wherein the Mixed Acid consists essentially of approximately equal amounts of nitric acid and sulfuric acid.

9. The process of claim 8 wherein the concentration of water is about 10 percent, and wherein following completion of the reaction water is added, thereby selectively precipitating the 2,4,7-trinitrofluorenone.

10. The process of claim 9, wherein the mole ratio of nitric acid to fluorenone is about 30 to 1.

* * * * *